(12) United States Patent
Ito et al.

(10) Patent No.: US 8,880,318 B2
(45) Date of Patent: Nov. 4, 2014

(54) VEHICLE CONTROLLING SYSTEM

(75) Inventors: Koji Ito, Nagoya (JP); Hiroshi Tsujii, Mishima (JP); Masaki Matsunaga, Ashigarakami-gun (JP); Nobukazu Ueki, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 598 days.

(21) Appl. No.: 13/060,174

(22) PCT Filed: Apr. 30, 2010

(86) PCT No.: PCT/JP2010/057712
§ 371 (c)(1),
(2), (4) Date: Feb. 22, 2011

(87) PCT Pub. No.: WO2011/135725
PCT Pub. Date: Nov. 3, 2011

(65) Prior Publication Data
US 2011/0270501 A1     Nov. 3, 2011

(51) Int. Cl.
*B60W 10/06*     (2006.01)
*F02N 11/08*     (2006.01)

(52) U.S. Cl.
CPC ..... *F02N 11/0833* (2013.01); *F02N 2300/2006* (2013.01); *F02N 2250/02* (2013.01); *F02N 2200/0807* (2013.01); *F02N 2200/0805* (2013.01); *F02N 11/0837* (2013.01); *Y02T 10/48* (2013.01)
USPC .................. 701/81; 701/71; 701/78; 303/10; 303/11; 303/12

(58) Field of Classification Search
USPC ........... 701/70, 71, 76, 78, 81; 303/10, 11, 12
See application file for complete search history.

(56) References Cited

U.S. PATENT DOCUMENTS 3,225,704 A    12/1965   Gilvar et al.
3,254,608 A     6/1966   Alden
(Continued)

FOREIGN PATENT DOCUMENTS

DE         10307462 A1    9/2004
DE    102007035424 A1    1/2009
(Continued)

OTHER PUBLICATIONS

Office Action issued in corresponding U.S. Appl. No. 13/697,145 dated Nov. 29, 2013.

(Continued)

*Primary Examiner* — Thomas G Black
*Assistant Examiner* — Peter D Nolan
(74) *Attorney, Agent, or Firm* — Sughrue Mion, PLLC

(57) ABSTRACT

A vehicle controlling system includes an engine serving as a power source of a vehicle; an electric storage device; an assist device that assists an operation of a driver by consuming power from the electric storage device so as to operate a running device that changes the running condition of the vehicle; and a starting device that consumes power from the electric storage device so as to start the engine, wherein the starting device automatically starts the engine based upon a physical quantity concerning the engine, and the start of the engine is inhibited while the assist device operates the running device, when the execution of an inertial running in which the engine is stopped to allow the vehicle to run with inertia.

5 Claims, 5 Drawing Sheets

(56) References Cited

U.S. PATENT DOCUMENTS

| | | | |
|---|---|---|---|
| 3,532,060 A | 10/1970 | Brush | |
| 4,414,937 A * | 11/1983 | Ueda et al. | 123/198 D |
| RE32,474 E * | 8/1987 | Reid | 307/10.1 |
| 6,190,284 B1 | 2/2001 | Kuroda et al. | |
| 6,267,706 B1 | 7/2001 | Kuroda et al. | |
| 6,401,012 B1 * | 6/2002 | Aoki et al. | 701/1 |
| 6,404,072 B2 | 6/2002 | Onoyama et al. | 290/40 C |
| 7,021,409 B2 * | 4/2006 | Tamor | 180/65.25 |
| 7,091,629 B2 * | 8/2006 | Hawkins | 307/10.6 |
| 7,223,204 B2 * | 5/2007 | Steen et al. | 477/97 |
| 7,753,150 B2 * | 7/2010 | Tamor | 180/65.265 |
| 7,823,668 B2 * | 11/2010 | Ogata et al. | 180/65.265 |
| 8,370,041 B2 * | 2/2013 | Gabor et al. | 701/78 |
| 2002/0079147 A1 | 6/2002 | Yamaguchi et al. | |
| 2002/0131621 A1 | 9/2002 | Ohta | |
| 2003/0022755 A1 * | 1/2003 | Mizutani | 477/107 |
| 2003/0197385 A1 * | 10/2003 | Onoyama et al. | 290/4 R |
| 2003/0221882 A1 | 12/2003 | Long | |
| 2004/0079342 A1 | 4/2004 | Kojima et al. | |
| 2005/0014605 A1 | 1/2005 | Ries-Mueller | |
| 2005/0137769 A1 | 6/2005 | Takamatsu et al. | |
| 2005/0209747 A1 | 9/2005 | Yakes et al. | |
| 2006/0030450 A1 | 2/2006 | Kyle | |
| 2006/0213703 A1 | 9/2006 | Long | |
| 2006/0228000 A1 | 10/2006 | Miyajima et al. | |
| 2007/0215395 A1 * | 9/2007 | Ogata et al. | 180/65.2 |
| 2007/0288131 A1 | 12/2007 | Yakes et al. | |
| 2008/0065285 A1 | 3/2008 | Yakes et al. | |
| 2008/0189040 A1 | 8/2008 | Nasu et al. | |
| 2008/0238189 A1 * | 10/2008 | Kuo et al. | 303/114.3 |
| 2010/0114448 A1 * | 5/2010 | Gabor et al. | 701/79 |
| 2010/0137100 A1 | 6/2010 | Kojima et al. | |
| 2010/0191446 A1 * | 7/2010 | Mc Donald et al. | 701/113 |
| 2010/0222965 A1 | 9/2010 | Kimura et al. | |
| 2010/0222991 A1 * | 9/2010 | Berr | 701/112 |
| 2010/0301668 A1 | 12/2010 | Yakes et al. | |
| 2011/0071746 A1 * | 3/2011 | O'Connor et al. | 701/101 |
| 2011/0212804 A1 | 9/2011 | Imamura et al. | |
| 2012/0031688 A1 | 2/2012 | Safranski et al. | |
| 2012/0323173 A1 | 12/2012 | Irie et al. | |
| 2012/0323473 A1 | 12/2012 | Irie et al. | |
| 2013/0060444 A1 | 3/2013 | Matsunaga et al. | |

FOREIGN PATENT DOCUMENTS

| | | |
|---|---|---|
| DE | 1020070354424 A1 | 1/2009 |
| JP | 11-002143 | 1/1999 |
| JP | 11-257116 A | 9/1999 |
| JP | 2000-310133 A | 11/2000 |
| JP | 2001-227375 A | 8/2001 |
| JP | 2002-213269 A | 7/2002 |
| JP | 2002-227885 | 8/2002 |
| JP | 2005-088703 | 4/2005 |
| JP | 2006-037780 A | 2/2006 |
| JP | 2006-161684 | 6/2006 |
| JP | 2007-187090 A | 7/2007 |
| JP | 2007-246050 A | 9/2007 |
| JP | 2007-255271 | 10/2007 |
| JP | 2007-291919 A | 11/2007 |
| JP | 2010-083323 A | 4/2010 |

OTHER PUBLICATIONS

International Search Report issued in PCT/JP2010/058130.
Office Action issued in obviousness-type double patenting copending U.S. Appl. No. 13/697,145 dated Mar. 20, 2014.
U.S. Non-Final Office Action dated Jul. 7, 2014, issued in corresponding U.S. Appl. No. 13/697,145.

* cited by examiner

VEHICLE CONTROLLING SYSTEM

FIELD

The present invention relates to a vehicle controlling system.

BACKGROUND

In a vehicle in which an engine can automatically be stopped, there has conventionally been known a technique of automatically starting the engine based upon a predetermined condition, when the engine is stopped.

For example, Patent Literature 1 discloses a technique in an automatically stopping/starting device of an engine that is provided with a sensor for detecting a negative pressure of a brake booster, and that starts the engine when the negative pressure drops to a predetermined value or less during the stop of the engine.

CITATION LIST

Patent Literature

Patent Literature 1: Japanese Patent Application Laid-open No. 2000-310133

SUMMARY

Technical Problem

When an engine is started by a starting device that consumes power from an electric storage device such as a battery in order to start an engine, a voltage drop is generated in the electric storage device at the time of starting the engine. A vehicle may be provided with an assist device that consumes power from the electric storage device during the running in order to operate a running device (e.g., a brake). A sufficient study has not conventionally been made for a start timing when the engine is automatically started during the running in the vehicle provided with the assist device. For example, there is a demand for suppressing the phenomenon in which the operation of the assist device and the voltage drop in the electric storage device due to the start of the engine simultaneously occur.

An object of the present invention is to provide the vehicle controlling system that can prevent the phenomenon in which the operation of the assist device and the start of the engine simultaneously occur, when the engine is automatically started in a vehicle provided with the assist device that consumes power from the electric storage device in order to operate a running device.

Solution to Problem

A vehicle controlling system according to the present invention includes an engine serving as a power source of a vehicle; an electric storage device; an assist device that assists an operation of a driver by consuming power from the electric storage device so as to operate a running device that changes the running condition of the vehicle; and a starting device that consumes power from the electric storage device so as to start the engine, wherein the starting device automatically starts the engine based upon a physical quantity concerning the engine and the start of the engine is inhibited while the assist device operates the running device, when the execution of an inertial running in which the engine is stopped to allow the vehicle to run with inertia.

In the vehicle controlling system, it is preferable that the assist device assists an operation of the driver performed to an operation member of the running device so as to operate the running device, and a value of the physical quantity is decreased by the operation to the operation member and is recovered when the engine is driven.

In the vehicle controlling system, it is preferable that the running device is a braking device that brakes the vehicle, the assist device assists a braking operation by the driver and consumes the power from the electric storage device so as to operate the braking device, and the physical quantity is a negative pressure of the engine introduced to a servo unit of the braking device.

In the vehicle controlling system, it is preferable that the inhibition of the start of the engine is canceled when the operation of the running device by the assist device is ended.

In the vehicle controlling system, it is preferable that when a running environment in which it is predicted that the assist device is to be operated is present ahead during the execution of the inertial running, the start of the engine by the starting device is inhibited even before the assist device operates the running device.

In the vehicle controlling system, it is preferable that when at least either one of a running environment in which it is predicted that the operation to the operation member is to be performed and a running environment in which it is predicted that the assist device is to be operated is present ahead during the execution of the inertial running, the engine is started by the starting device before the operation of the assist device.

In the vehicle controlling system, it is preferable that when it is predicted that the physical quantity is not a value for issuing a request of starting the engine, even when the actual operation is made in the running environment in which it is predicted that the operation to the operation member is to be made, the engine is not started.

In the vehicle controlling system, it is preferable that when at least either one of a running environment in which it is predicted that the operation to the operation member is to be performed and a running environment in which it is predicted that the assist device is to be operated is present ahead, a request of starting the engine is issued with the negative pressure greater than that in the case where neither of the running environments is present ahead.

A vehicle controlling system according to the present invention includes an engine serving as a power source of a vehicle; an electric storage device; an assist device that assists an operation of a driver by consuming power from the electric storage device so as to operate a running device that changes the running condition of the vehicle; and a starting device that consumes power from the electric storage device so as to start the engine, wherein when at least either one of a running environment in which it is predicted that the operation to the operation member of the running device is to be performed and a running environment in which it is predicted that the assist device is to be operated is present ahead during the execution of an inertial running in which the engine is stopped to allow the vehicle to run with inertia, the engine is started by the starting device before the operation of the assist device.

In the vehicle controlling system, it is preferable that whether the engine is started is determined based upon a physical quantity concerning the engine a value of which changes according to the operation to the operation member.

Advantageous Effects of Invention

In a vehicle controlling system according to the present invention, during an execution of an inertial running in which an engine is stopped to allow a vehicle to run with inertia, the engine is automatically started by a starting device based upon a physical quantity involved with the engine, and the start of the engine during when the assist device operates the running device is inhibited. The vehicle controlling system according to the present invention can provide an effect of preventing a phenomenon in which the operation of the assist device and the start of the engine simultaneously occur.

DESCRIPTION OF EMBODIMENTS

One embodiment of a vehicle controlling system according to the present invention will be described below in detail with reference to the drawings. It is to be noted that the present invention is not limited by the embodiments. The constituents in the embodiments below include those that could easily been made by a person skilled in the art or those that are substantially equal.

First Embodiment

Figure 1:
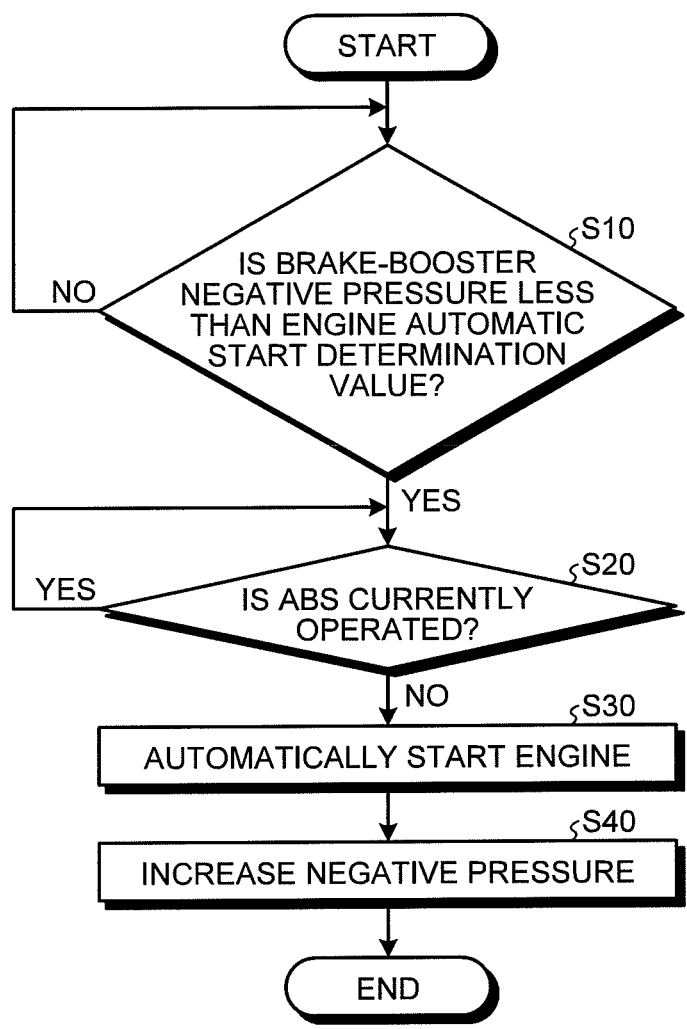
FIG. 1 is a flowchart illustrating an operation of a vehicle controlling system according to a first embodiment.
Figure 2:
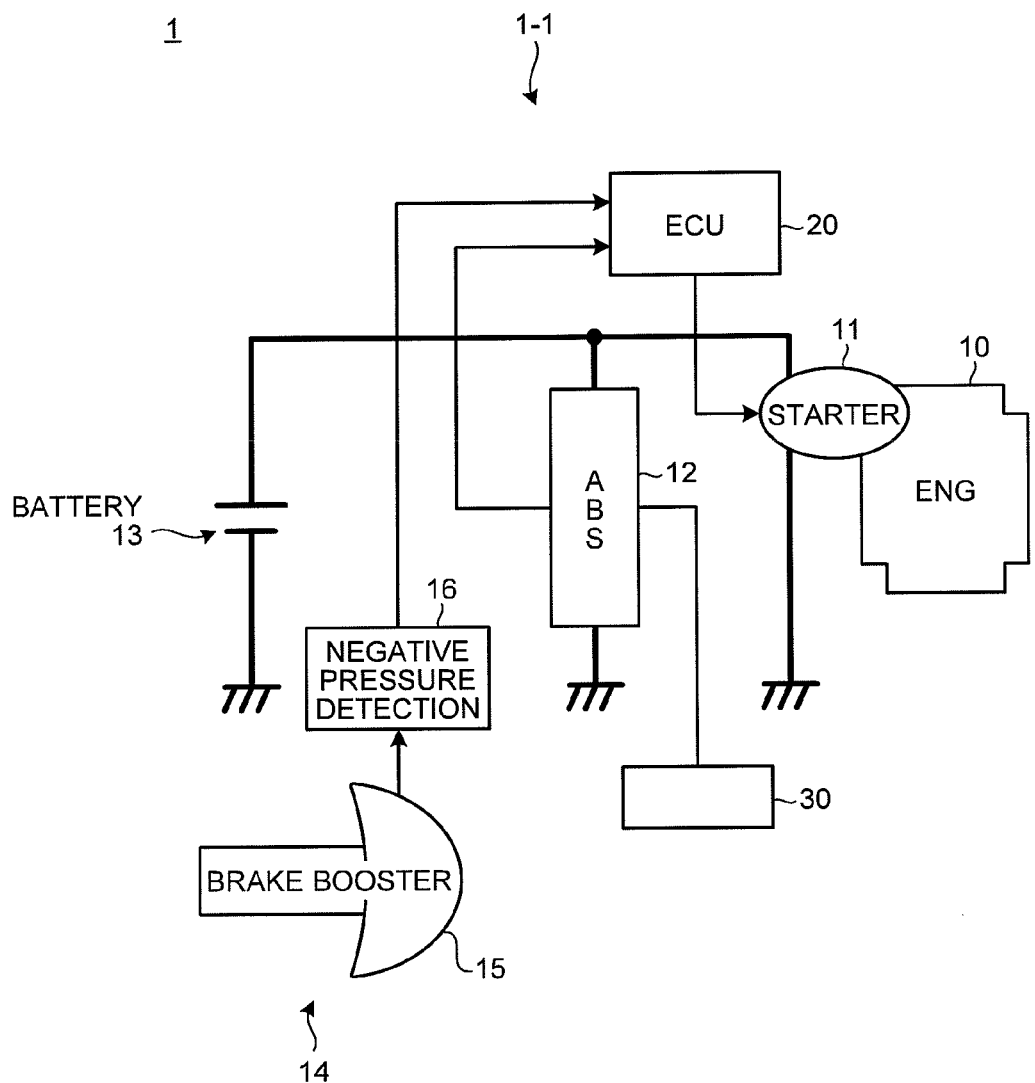
FIG. 2 is a structural diagram schematically illustrating an essential part of the vehicle according to the first embodiment.

The first embodiment will be described with reference to FIGS. 1 to 3. The present embodiment relates to a vehicle controlling system that automatically starts an engine. FIG. 1 is a flowchart illustrating an operation of the vehicle controlling system according to the first embodiment, and FIG. 2 is a structural diagram schematically illustrating an essential part of the vehicle according to the first embodiment.

The vehicle (see reference numeral 1 in FIG. 2) according to the present embodiment can stop the engine so as to enhance fuel consumption during when the vehicle stops and when the vehicle runs. The vehicle 1 includes a brake booster that utilizes a negative pressure of the engine. When a brake pedal is depressed plural times during when the engine is stopped, the negative pressure in the brake booster, which utilizes the negative pressure of the engine, lowers. In this case, the negative pressure is secured by automatically starting the engine. However, immediately after the starter is energized in order to start the engine, a battery voltage is lowered because of the rush current.

On the other hand, the vehicle 1 is provided with an ABS apparatus. When a tire is going to be locked due to a sudden braking, the ABS apparatus can prevent the lock. When the ABS apparatus consumes the power from the battery so as to operate the brake, it is desirable that the operation of the ABS apparatus and the voltage drop of the battery due to the start of the engine do not simultaneously occur. In the vehicle in which the engine is stopped during the free running, or during the deceleration before the stop, the engine is stopped even when the vehicle speed is not 0. Therefore, there is a possibility that the automatic start of the engine and the operation of the ABS apparatus simultaneously occur.

The vehicle controlling system according to the present embodiment inhibits the start of the engine during when the ABS apparatus is operated. The vehicle controlling system automatically starts the engine at the point when the operation of the brake by the ABS apparatus is ended (the control for the brake hydraulic pressure by the ABS apparatus is ended). Therefore, the vehicle controlling system according to the present invention can prevent that the operation of the ABS apparatus and the voltage drop of the battery due to the start of the engine simultaneously occur. Since the excessive reduction in the battery voltage is prevented, the deterioration of the battery can be prevented.

The present embodiment is based upon a vehicle provided with the constituents (1) to (6) described below.

(1) a power train system that stops the engine to make inertial running possible during the running
(2) brake system (brake booster, booster negative pressure detecting apparatus)
(3) starter motor
(4) ABS
(5) Battery
(6) ECU A vehicle 1 is illustrated in FIG. 2. The vehicle 1 includes an engine 10 serving as a power source, an ABS apparatus 12, a battery 13, a brake booster 14, and a brake 30.

The engine 10 is a known heat engine, for example, an internal combustion engine. The engine 10 has a starter 11. The starter 11 is a starting device that consumes power from the battery 13 to start the engine 10. The starter 11 is, for example, a known starter motor, and it rotates by the power from the battery 13, thereby rotating the engine 10.

The battery 13 is an electric storage device that can be charged and discharged. A lead storage battery can be used as the battery 13, for example. The battery 13 can supply power to the starter 11 and the ABS apparatus 12. The battery 13 can also be charged by the power generated by an unillustrated alternator of the engine 10.

The ABS apparatus 12 is an assist device for assisting the braking operation by a driver. The brake 30 is arranged at each of unillustrated wheels of the vehicle 1. The brake 30 is a braking device that generates braking force by the supplied oil pressure so as to stop the vehicle 1. The brake 30 is a running apparatus for changing the running state of the vehicle 1 by the braking force. A disk brake, which generates the braking force by the operation in which a brake pad is pressed against a brake rotor by the supplied oil pressure, can be used as the brake 30. The ABS apparatus 12 consumes the power from the battery 13 to operate the brake 30, thereby assists the operation (driving operation) by the driver.

The vehicle 1 is provided with an unillustrated brake pedal that is an operation member of the brake 30. The ABS apparatus 12 assists the driver's operation on the brake pedal so as to operate the brake 30. The ABS apparatus 12 detects a wheel speed of each of the wheels during the braking, and controls the brake hydraulic pressure supplied to the brake 30, thereby prevents the lock of the wheel. The ABS apparatus 12 has a controller, a hydraulic pump, and a solenoid valve, those of which are not illustrated. The controller in the ABS apparatus 12 operates the solenoid valve, based upon the detected wheel speed, to adjust the brake hydraulic pressure supplied to the brake 30 from the hydraulic pump.

The brake booster 14 is a servo unit of the brake 30. The brake booster 14 utilizes the negative pressure of the engine 10 to assist the pedal effort on the brake pedal. A negative pressure chamber 15 of the brake booster 14 is connected to an unillustrated intake passage of the engine 10. When the engine 10 is operated, the intake passage has a negative pressure, and this negative pressure is introduced into the negative pressure chamber 15. When the brake pedal is depressed by the driver, the pedal effort is boosted by the difference between the negative pressure in the negative pressure chamber 15 and the atmospheric pressure, and the resultant is transmitted to a master cylinder. When the brake booster 14 is operated by the brake operation, the negative pressure is consumed by the brake booster 14, whereby the negative pressure is supplied from the intake passage of the engine 10 to the negative pressure chamber 15. The vehicle 1 is provided with a negative pressure sensor 16 for detecting the negative pressure in the negative pressure chamber 15.

The vehicle 1 has an electric control unit (ECU) 20 for controlling the respective units of the vehicle 1 including the engine 10. The ECU 20 is electrically connected to the engine 10 so as to execute various controls of the engine 10. For example, the ECU 20 controls the injection amount or injection timing of fuel in the engine 10, and an ignition timing. The ECU 20 also executes a starting control of the engine 10. When the engine 10 is started, the ECU 20 operates the starter 11 to execute cranking of the engine 10, and after the revolution of the engine 10 increases due to the cranking, it performs an injection and ignition of the fuel to the engine 10. The ECU 20 performs a total control of the vehicle 1 including the control of the engine 10. A vehicle controlling system 1-1 according to the present embodiment includes the engine 10, the starter 11, the battery 13, the ABS apparatus 12, and the ECU 20.

The ECU 20 can execute the inertial running in which it stops the engine 10 to remove resistive loss of the engine (or engine brake loss) in order to allow the vehicle 1 to run by inertia. The inertial running is executed when the accelerator is turned off during the running of the vehicle 1. When the ECU 20 determines that the accelerator is turned off based upon the detection result of a sensor that detects an operation amount of an unillustrated accelerator pedal, it executes the inertial running. The vehicle 1 is provided with a clutch between the engine 10 and an unillustrated driving wheel of the vehicle 1. When the clutch is engaged, the engine 10 and the driving wheel are connected to be capable of transmitting power. When the clutch is disengaged, the engine 10 and the driving wheel are separated, so that the power cannot be transmitted. During the inertial running, the ECU 20 disengages the clutch between the engine 10 and the driving wheel to drive the vehicle 1 with the revolution of the engine 10 being stopped.

Since the engine 10 is stopped during the inertial running as described above, the negative pressure is lowered (decreased) every time the brake operation is performed. When the speed is reduced with the brake with the engine being stopped, the intake negative pressure of the engine 10 cannot be utilized, so that the negative pressure of the brake booster is lowered when the brake pedal is depressed. In particular, when the brake pedal is depressed plural times (pumping brake), the negative pressure of the brake booster is greatly reduced.

The ECU 20 automatically starts the engine 10 to secure the negative pressure in order to keep the assist function by the brake booster 14. When the negative pressure in the negative pressure chamber 15 drops to a predetermined threshold value Pt, the ECU 20 restarts the engine 10 by the starter 11 so as to increase the negative pressure. The threshold value Pt is set based upon the range of the negative pressure needed to attain the function of the brake booster 14. The threshold value Pt is set based upon the lower limit value of the negative pressure by which the brake booster 14 can appropriately exhibit the boosting function. When the negative pressure in the negative pressure chamber 15 drops to the threshold value Pt, the engine 10 is started to increase the negative pressure, whereby the brake booster 14 can always appropriately function as a servo unit. As described above, the ECU 20 automatically starts the engine 10 based upon the negative pressure in the negative pressure chamber 15, which is a physical quantity involved with the engine 10 during the execution of the inertial running.

Since the starter current for starting the engine 10 is a high current, the battery voltage is greatly reduced at the time of starting the engine. The restart of the engine 10 due to the reduction in the negative pressure and the operation of the ABS apparatus 12 are generated by the depression of the brake pedal. Therefore, both of them might simultaneously occur. For example, when the negative pressure in the negative pressure chamber 15 is decreased to start the engine 10 during when the ABS apparatus 12 is operated, the voltage drop of the battery 13 occurs during the operation of the ABS apparatus 12. It is desirable to prevent that the operation of the ABS apparatus 12 and the voltage drop of the battery due to the start of the engine simultaneously occur.

The vehicle controlling system 1-1 according to the present embodiment gives priority to the operation of the ABS apparatus 12 over the start of the engine as described below. During the operation of the ABS apparatus 12, the automatic start of the engine 10 is inhibited, and the start of the engine 10 is delayed until the operation of the brake 30 due to the ABS apparatus 12 is ended. The ECU 20 inhibits the start of the engine 10 by the starter 11 during when the ABS apparatus 12 operates the brake 30 as described above, whereby it can prevent that the operation of the ABS apparatus 12 and the voltage drop of the battery 13 due to the start of the engine simultaneously occur.

The operation of the present embodiment will be described with reference to FIGS. 1 to 3. FIG. 3 is a diagram illustrating one example of a time chart when the vehicle control according to the present embodiment is executed. In FIG. 3, (a) illustrates the brake-booster negative pressure that is the negative pressure in the negative pressure chamber 15 of the brake booster 14, while (b) illustrates the output voltage of the battery 13. As illustrated in FIG. 3, when the brake pedal is depressed, the brake-booster negative pressure is lowered. On the contrary, when the brake pedal is released, the brake-booster negative pressure is more greatly reduced than in the case in which the brake pedal is depressed.

Referring to FIG. 1, the ECU 20 firstly determines whether the brake-booster negative pressure, which is the negative pressure in the negative pressure chamber 15, is less than an engine automatic start determination value in step S10. The engine automatic start determination value is the threshold value Pt of the negative pressure for determining whether the engine 10 is automatically started. The ECU 20 makes the determination in step S10 based upon the result of the comparison between the negative pressure in the negative pressure chamber 15 detected by the negative pressure sensor 16 and the predetermined threshold value Pt. In FIG. 3, the brake-booster negative pressure becomes less than the threshold value Pt at a time t1, which is the state in which the positive determination is made in step S10. When the brake-booster negative pressure is less than the engine automatic start determination value as a result of the determination in step S10 (step S10—Y), the ECU 20 proceeds to step S20, and if not (step S10—N), it repeats the determination in step S10 until the positive determination is made.

In step S20, the ECU 20 determines whether the ABS apparatus 12 is currently operated. The ECU 20 detects whether the ABS apparatus 12 is currently operated from the communication with the controller of the ABS apparatus 12.

Figure 3:
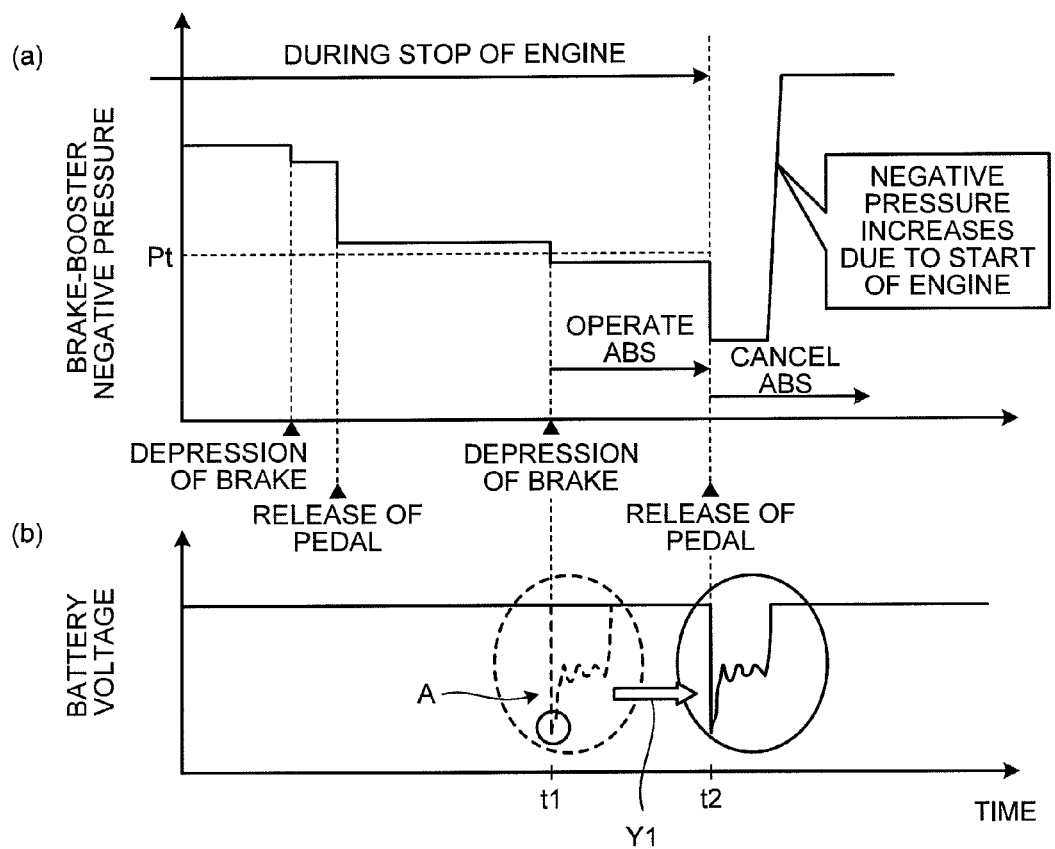
FIG. 3 is a time chart when the vehicle control according to the first embodiment is executed.

In FIG. 3, the brake pedal is depressed, so that the ABS apparatus 12 starts its operation at the time t1, and the ABS apparatus 12 is continuously operated until the brake pedal is turned OFF (released) at a time t2. Thus, the positive determination is made in step S20 during the period from the time t1 to the time t2. During the operation of the ABS apparatus 12, the ECU 20 repeats the determination in step S20 without proceeding to the next step S30 (engine automatic start), so that the start of the engine 10 is inhibited. When the ABS apparatus 12 is determined to be currently operated as a result of the determination in step S20 (step S20—Y), the determination in step S20 is repeated until the negative determination is made (until the operation of the ABS apparatus 12 is ended). When the ABS apparatus 12 is determined not to be currently operated (step S20—N), the ECU 20 proceeds to step S30.

In step S30, the ECU 20 automatically starts the engine 10. Since the operation of the brake 30 by the ABS apparatus 12 is ended, the ECU 20 cancels the inhibition of the start of the engine 10 to operate the starter 11, whereby the engine 10 is rotated to be started. In FIG. 3, the operation of the ABS apparatus 12 is ended, and the engine 10 is started at the time t2. When the brake-booster negative pressure in the negative pressure chamber 15 increases due to the start of the engine 10 (step S40), this control flow is ended.

As described above, in the vehicle controlling system 1-1 according to the present embodiment, the start of the engine 10 is not executed during when the ABS apparatus 12 is operated (step S20—Y), and when the operation of the ABS apparatus 12 is ended (step S20—N), the engine 10 is started. This process prevents that the operation of the ABS apparatus 12 and the voltage drop of the battery 13 by the start of the engine 10 simultaneously occur. When the engine 10 is started during the operation of the ABS apparatus 12, the voltage drop of the battery occurs simultaneous with the operation of the ABS apparatus 12 as indicated by a symbol A in FIG. 3. On the other hand, in the vehicle controlling system 1-1 according to the present embodiment, the start timing of the engine 10 is delayed to the completion of the operation of the ABS apparatus 12 as indicated by an arrow Y1, which prevents that the voltage drop of the battery and the operation of the ABS apparatus 12 simultaneously occur. When the operation of the ABS apparatus 12 is ended, the engine 10 is started to operate the engine 10, so that the negative pressure increases (recovers). Therefore, the brake-booster negative pressure can promptly be recovered before the next brake operation is made.

In the present embodiment, the assist device that takes priority over the start of the engine 10 is the ABS apparatus 12. However, the assist device is not limited thereto. For example, a brake assist device that generates strong braking force by an actuator when the brake pedal is sharply depressed, or a vehicle stability control (VSC) apparatus that eases the slip of the wheel by the brake control, may take priority over the start of the engine 10. For example, it may be configured such that, even when the brake pedal is depressed and the negative pressure in the negative pressure chamber 15 drops to be less than the threshold value Pt during when the VSC apparatus is operated, the start of the engine 10 is inhibited during the operation of the VSC apparatus, and after the completion of the operation of the VSC apparatus, the engine 10 is started. Specifically, the assist device can be the one that consumes the power from the battery 13 so as to operate the brake 30, wherein the one other than the ABS apparatus 12 takes priority over the start of the engine 10. The assist device may be operated not only when the brake pedal is depressed.

The running device operated by the assist device is not limited to the brake 30. The assist device that operates the running device other than the brake 30 may take priority over the start of the engine 10.

Modification of First Embodiment

In the first embodiment described above, the start of the engine 10 is inhibited when the ABS apparatus 12, serving as the assist device, has already been operated. Additionally, when the running environment in which the assist device is predicted to be operated, the start of the engine 10 may be inhibited even before the assist device operates the running device. The case in which the assist device is the ABS apparatus 12 will be described as one example. The running environment in which the ABS apparatus 12 is predicted to be operated is present ahead means that, for example, there is a corner ahead, and hence, it is predicted that the brake operation is made, and further, the operation of the ABS apparatus 12 is predicted because the road ahead is wet or icy. The running environment described above can be acquired by a known apparatus such as a navigation system.

When the running environment in which the assist device is predicted to be operated is present ahead, the start of the engine 10 is inhibited beforehand before the assist device operates the running device, which prevents that the start of the engine 10 and the operation of the ABS apparatus simultaneously occur.

Second Embodiment

The second embodiment will be described with reference to FIGS. 4 and 5. The components in the second embodiment having the function similar to the function of the components in the first embodiment are identified by the same numerals, and the description will not be repeated.

The different point of a vehicle controlling system 1-2 according to the present embodiment from the vehicle controlling system 1-1 in the first embodiment is such that the engine 10 is started before the operation of the ABS apparatus 12, when the ABS apparatus 12 is predicted to be operated, in order to prevent that the operation of the ABS apparatus 12 and the start of the engine 10 simultaneously occur. Specifically, in the first embodiment, the engine 10 is started after the operation of the ABS apparatus 12, while the engine 10 is started before the operation of the ABS apparatus 12 in the present embodiment. FIG. 4 is a structural diagram schematically illustrating a vehicle according to the present embodiment, and FIG. 5 is a diagram illustrating one example of a time chart when the vehicle control according to the present embodiment is executed.

Figure 4:
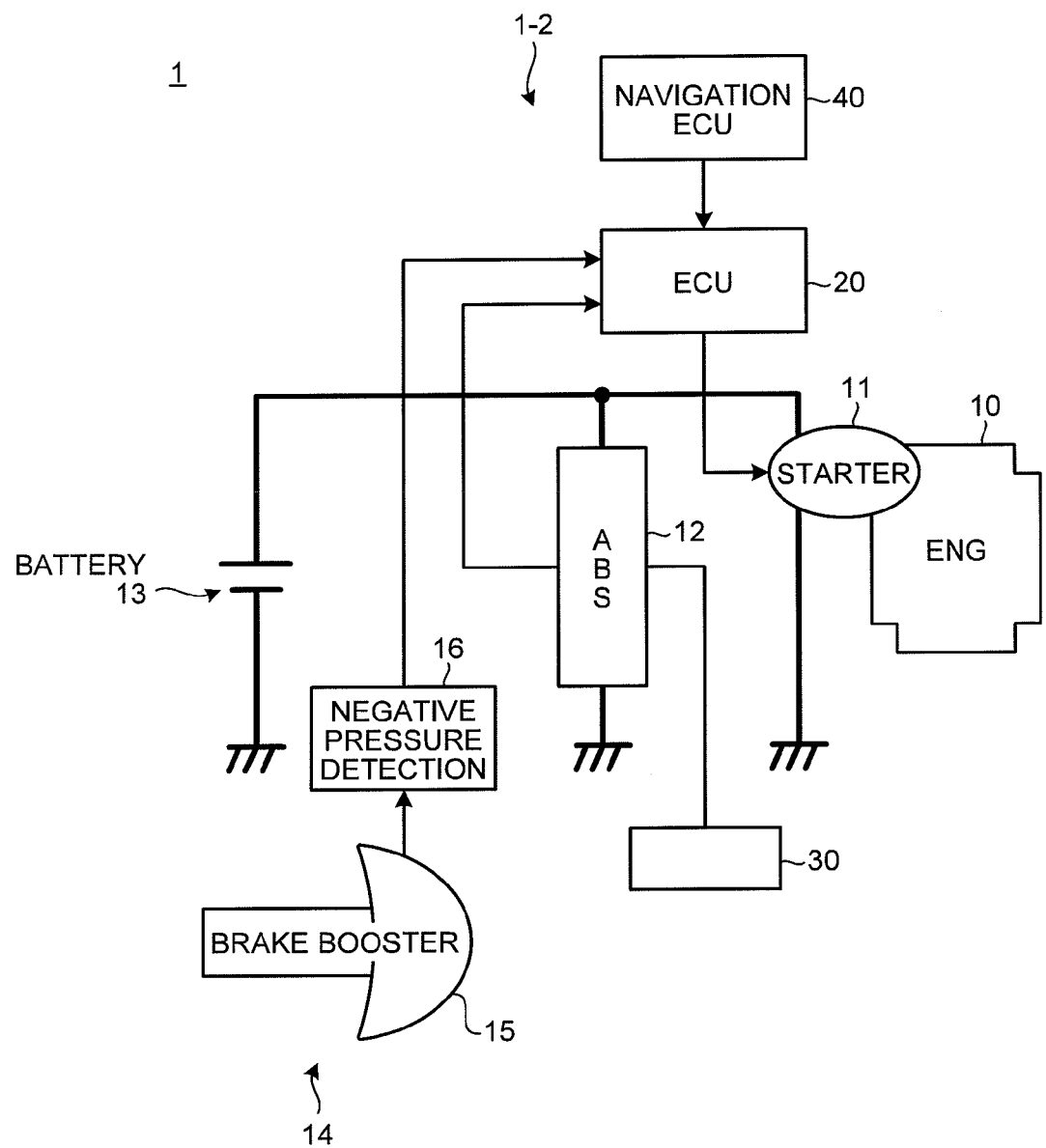
FIG. 4 is a structural diagram schematically illustrating an essential part of a vehicle according to a second embodiment.

As illustrated in FIG. 4, the vehicle 1 has a navigation ECU 40. The navigation ECU 40 is a control apparatus for an unillustrated navigation system. Examples of usable navigation system include a vehicle position detecting apparatus that detects the current position of the vehicle, and a known system having a map database. It is preferable that the navigation system can externally acquire road information by inter-vehicle communications with the other vehicle. The ECU 20 is connected to the navigation ECU 40, and it can acquire a running environment involved with the position of the vehicle and the road ahead based upon the signal from the navigation ECU 40.

Figure 5:
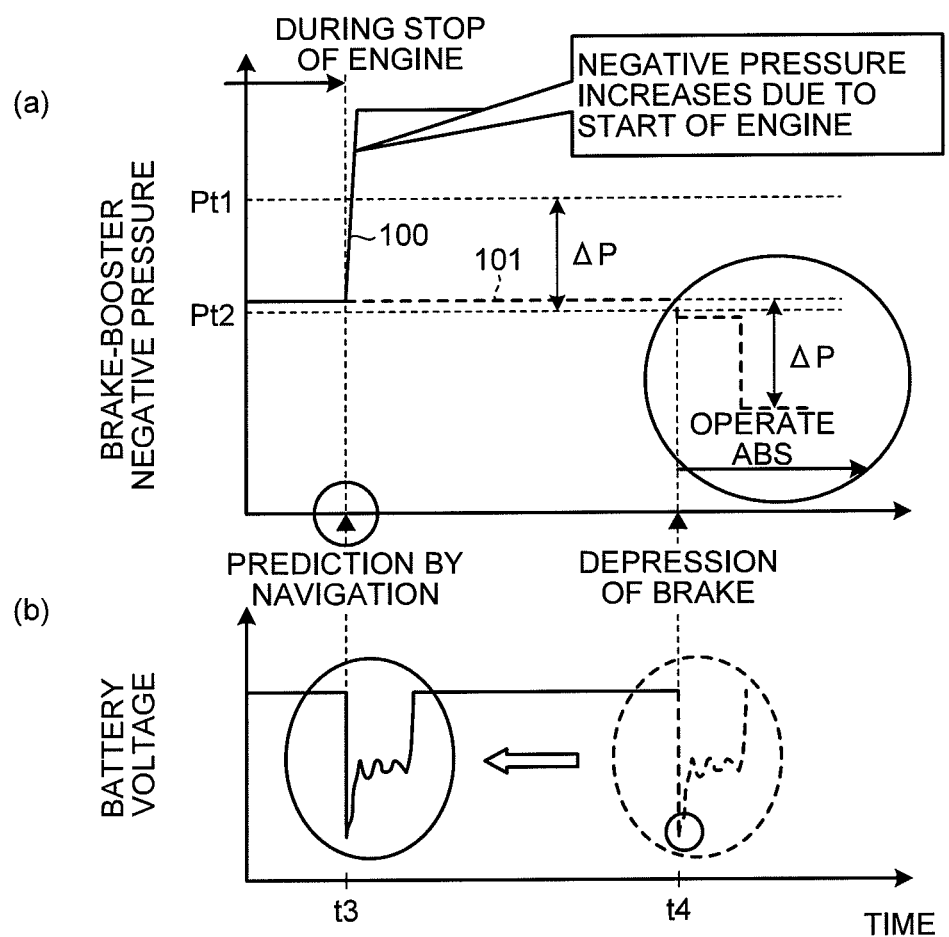
FIG. 5 is a time chart when the vehicle control according to the second embodiment is executed.

Referring to FIG. 5, the vehicle controlling system 1-2 according to the present embodiment starts the engine 10 before the brake operation is executed (before the ABS apparatus 12 is operated), when it predicts that the ABS apparatus 12 is operated because of the operation of the brake pedal, and that request of starting the engine 10 is issued by the reduction in the brake-booster negative pressure corresponding to the predicted operation.

In FIG. 5, (a) illustrates the brake-booster negative pressure, while (b) illustrates the output voltage of the battery 13. The transition of the brake-booster negative pressure when the control of the present embodiment is executed is represented by a symbol 100. One example of the transition of the conventional brake-booster negative pressure is represented by a symbol 101. Pt1 and Pt2 indicate the threshold values involved with the brake-booster negative pressure.

The second threshold value Pt2 is the value similar to the threshold value Pt (see FIG. 3) in the first embodiment. When the brake-booster negative pressure drops to be less than the second threshold value Pt2, the request of starting the engine 10 based upon the brake-booster negative pressure is issued. The first threshold value Pt1 is determined based upon the second threshold value Pt2 and the negative-pressure change amount ΔP. The negative-pressure change amount ΔP indicates the decreasing amount (the magnitude of the decreasing amount) of the brake-booster negative pressure in one brake operation, which is the period from when the brake pedal is depressed upon the start of the brake operation to when the brake pedal is released to end the brake operation.

The first threshold value Pt1 is the negative pressure greater than the second threshold value Pt2, and the difference between the first threshold value Pt1 and the second threshold value Pt2 is specified as the negative-pressure change amount ΔP. Accordingly, when the brake operation is made in case where the current negative pressure in the negative pressure chamber 15 is the negative pressure between the first threshold value Pt1 and the second threshold value Pt2, the brake-booster negative pressure after the operation of the brake operation becomes smaller than the second threshold value Pt2, whereby it can be predicted (estimated) that there is a need to start the engine 10. In the present embodiment, when the brake operation is made and it is predicted that the ABS apparatus 12 is operated, in case where the brake-booster negative pressure is less than the first threshold value Pt1, and not less than the second threshold value Pt2, the engine 10 is started before the operation of the ABS apparatus 12. Specifically, the ECU 20 determines whether the engine 10 is started based upon the brake-booster negative pressure that is the physical quantity changed by the brake operation, in addition to the running environment.

The negative-pressure change amount ΔP is a predetermined value. The decreasing amount of the brake-booster negative pressure when the driver actually performs the brake operation varies depending upon the amount of the brake operation. The negative-pressure change amount ΔP is, for example, the maximum value of the decreasing amount in the brake-booster negative pressure in one brake operation. When it is predicted that there is a small possibility of the brake-booster negative pressure being less than the second threshold value Pt2 by the next brake operation in case where the negative-pressure change amount ΔP is set as described above, the engine 10 is always started. As a result, the chance that the brake-booster negative pressure becomes less than the second threshold value Pt2 and the request of starting the engine 10 is issued is reduced. Therefore, the simultaneous occurrence of the request of starting the engine 10 and the operation of the ABS apparatus 12 can be prevented before it occurs.

The ECU 20 starts the engine 10 before the brake operation is made, when it is predicted that the request of starting the engine 10 is issued because the brake operation is made and the brake-booster negative pressure is reduced. The ECU 20 determines whether the brake operation is made based upon the running environment ahead acquired from the navigation ECU 40 during the inertial running. Specifically, the ECU 20 determines whether the running environment in which the brake operation is predicted to be made is present ahead of the vehicle, e.g., the running environment in which the vehicle has to be decelerated or stopped, such as a curve, intersection, railway crossing, traffic signal, etc., is present or not. The ECU 20 also acquires road surface information as the running environment acquired from the navigation ECU 40. The road surface information is the one involved with the condition of the road surface, such as whether the road surface is wet, or whether the road surface is icy. It can be estimated that the ABS apparatus 12 is easy to be operated when the brake operation is made on a road having a small coefficient μ of friction on a road, such as a wet road or icy road. The road having a small coefficient μ of friction on a road is the running environment in which the ABS apparatus 12 is predicted to be operated.

The ECU 20 may predict the operation of the assist device, such as the ABS apparatus 12, based upon the information acquired by the inter-vehicle communications, instead of the road surface information. For example, when the information indicating that the assist device such as the ABS apparatus is operated in a leading vehicle that is running on a road ahead is acquired from the communication with the leading vehicle, it can be predicted that the assist device is operated when the vehicle runs on this road.

The ECU 20 starts the engine 10 before the operation of the ABS apparatus 12, when the brake-booster negative pressure is between the first threshold value Pt1 and the second threshold value Pt2, and the running environment in which the brake operation is predicted to be made, or the running environment in which the ABS apparatus 12 is predicted to be operated, is present ahead based upon the acquired running environment. In FIG. 5, the brake-booster negative pressure before a time t3 is the negative pressure between the first threshold value Pt1 and the second threshold value Pt2. In the conventional control in which the start of the engine is not performed based upon the prediction of the brake operation, the request of starting the engine 10 is issued at the time when the brake operation is started and a brake-booster negative pressure 101 falls below the second threshold value Pt2 at a time t4. When the ABS apparatus 12 is operated, the situation in which the operation of the ABS apparatus 12 and the start of the engine 10 simultaneously occur is generated.

On the other hand, in the vehicle controlling system 1-2 according to the present embodiment, the engine 10 is started when the operation of the ABS apparatus 12 is predicted based upon the running environment. At the time t3, the running environment, in which the ABS apparatus 12 is predicted to be operated through the brake operation, is detected ahead based upon the information from the navigation ECU 40. Thus, the ECU 20 starts the engine 10 by the starter 11 at the time t3. As a result, a brake-booster negative pressure 100 in case where the control of the present embodiment is executed increases from the time t3, and at the time t4 when the brake operation is started, it has a sufficient magnitude. Accordingly, the request of starting the engine 10 is not issued even when the brake operation is made, with the result that the simultaneous occurrence of the operation of the ABS apparatus 12 and the request of starting the engine 10 is prevented.

In the present embodiment, when the brake-booster negative pressure is not less than the first threshold value Pt1, the engine 10 is not started, even when the operation of the ABS apparatus 12 is predicted. Specifically, the ECU 20 does not start the engine 10, when it is predicted that the brake-booster negative pressure does not fall below the second threshold value Pt2 (the value by which the request of starting the engine 10 is issued) even when the brake operation is actually made in the running environment in which the brake operation is predicted to be made. Accordingly, the engine 10 can be started before the operation of the ABS apparatus 12 only when the effect caused by starting the engine 10 beforehand is expected.

When the engine 10 is started based upon the prediction of the operation of the ABS apparatus 12, it is desirable that the ECU 20 detects at least the running environment of the road ahead of the point where the vehicle reaches with the time needed for the start of the engine 10, in order that the start of the engine 10 is completed before the driver makes the brake operation. Specifically, when the vehicle runs with a high speed, the prediction of the brake operation or the prediction of the operation of the ABS apparatus 12 may be performed based upon the running environment ahead of the case in which the vehicle runs with a low speed.

In the present embodiment, the engine 10 is started when the running environment in which the brake operation is predicted to be made, and the running environment in which the ABS apparatus 12 is predicted to be operated, are present ahead. However, the present invention is not limited thereto. For example, the engine 10 may be started before the operation of the ABS apparatus 12, when either one of the running environment in which the brake operation is predicted to be made, and the running environment in which the ABS apparatus 12 is predicted to be operated, is present ahead.

When the engine 10 is started before the operation of the ABS apparatus 12 in case where either one of the running environment in which the brake operation is predicted to be made, and the running environment in which the ABS apparatus 12 is predicted to be operated, is present ahead, the engine 10 is started even with the brake-booster negative pressure larger than the second threshold value Pt2. On the other hand, when neither the running environment in which the brake operation is predicted to be made, nor the running environment in which the ABS apparatus 12 is predicted to be operated, is present ahead, the engine 10 is started after the brake-booster negative pressure falls below the second threshold value Pt2. Specifically, when either one of the running environment in which the brake operation is predicted to be made, and the running environment in which the ABS apparatus 12 is predicted to be operated, is present ahead, the request of starting the engine 10 is issued with the brake-booster negative pressure greater than that in the case where neither of the running environments is present ahead.

When the assist device is the type that is operated even when the brake operation is not made, it is preferable that the engine 10 is started based upon the running environment, such as the road surface information, in which the assist device is predicted to be operated. For example, in case where the VSC apparatus is of the type that can be operated regardless of the brake operation, and in case where the running environment by which the VSC apparatus is highly possibly operated, such as a wet road or icy road, is detected ahead, it is preferable that the request of starting the engine 10 is issued regardless of the prediction of the brake operation.

First Modification of Second Embodiment

The possibility of the assist device such as the ABS apparatus 12 being operated may be predicted based upon whether the operation other than the brake operation, such as a steering operation, is predicted. It can be estimated that the possibility of the assist device being operated is increased, because of the deterioration in the vehicle stability, due to the operation other than the brake operation, such as the steering operation. If the engine 10 is started when the running environment, by which the operation for deteriorating the vehicle stability can be estimated, is present ahead, the simultaneous occurrence of the operation of the assist device and the start of the engine 10 can surely be prevented.

The possibility of the operation of the assist device such as the ABS apparatus 12 may be predicted not only based upon the running environment but also based on the vehicle speed or the like. The operation of the assist device may be predicted based upon a technique of a driver or a running pattern. For example, when a technique of a driver is low, or when a driver controls the vehicle speed with great acceleration or deceleration, the possibility of the assist device being operated is estimated higher than the case in which a technique of a driver is high or a driver controls the vehicle speed with a small acceleration or deceleration, with respect to the similar running environment.

Second Modification of Second Embodiment

In the present embodiment, the negative-pressure change amount $\Delta P$ is set to the maximum value of the decreasing amount of the brake-booster negative pressure in one brake operation. However, the invention is not limited thereto. The negative-pressure change amount $\Delta P$ may be set based upon the range of the decreasing amount of the brake-booster negative pressure in one brake operation. For example, the negative-pressure change amount $\Delta P$ may be the intermediate value or the minimum value in the range of the decreasing amount of the brake-booster negative pressure. As the negative-pressure change amount $\Delta P$ is set to be the smaller value in the range of the decreasing amount of the brake-booster negative pressure, the chance that the engine 10 is started before the brake operation is decreased. Therefore, it is advantageous from the viewpoint of increasing fuel consumption. The negative-pressure change amount $\Delta P$ may be variable based upon the running environment, a technique of a driver, or a running pattern.

For example, when the negative-pressure change amount $\Delta P$ is variable based upon the running environment, the amount of the brake operation (stroke) is estimated based upon the running environment ahead. When it is predicted that the brake operation is made based upon the corner ahead, for example, the amount of the brake operation is estimated based upon the curvature of the corner, the current vehicle speed, or the distance to the corner. The decreasing amount of the brake-booster negative pressure generated by the brake operation upon entering the corner is estimated from the estimated amount of the brake operation, and the negative-pressure change amount $\Delta P$ is determined corresponding to the estimated decreasing amount. When the estimated decreasing amount is small, the negative-pressure change amount $\Delta P$ is set to be a small value, while when the estimated decreasing amount is great, the negative-pressure change amount $\Delta P$ is set to be a great value. When the negative-pressure change amount $\Delta P$ is determined based upon the running environment, whether the brake-booster negative pressure falls below the second threshold value Pt2 by the brake operation can precisely be determined.

INDUSTRIAL APPLICABILITY

As described above, the vehicle controlling system according to the present invention is useful to a vehicle that can automatically start an engine, and more particularly suitable for preventing that the operation of the assist device and the start of the engine simultaneously occur.

REFERENCE SIGNS LIST 1-1, 1-2 VEHICLE CONTROLLING SYSTEM
1 VEHICLE
10 ENGINE
11 STARTER
12 ABS APPARATUS
13 BATTERY
14 BRAKE BOOSTER
15 NEGATIVE PRESSURE CHAMBER
16 NEGATIVE PRESSURE SENSOR
20 ECU
30 BRAKE
40 NAVIGATION ECU
Pt THRESHOLD VALUE
Pt1 FIRST THRESHOLD VALUE
Pt2 SECOND THRESHOLD VALUE
ΔP NEGATIVE-PRESSURE CHANGE AMOUNT

The invention claimed is:

1. A vehicle controlling system comprising:
an engine serving as a power source of a vehicle;
an electric storage device;
an assist device that assists an operation of a driver by consuming power from the electric storage device so as to operate a running device that changes the running condition of the vehicle; and
a starting device that consumes power from the electric storage device so as to start the engine, wherein
when at least either one of a running environment in which it is predicted that the operation to the operation member of the running device is to be performed and a running environment in which it is predicted that the assist device is to be operated is present ahead during the execution of an inertial running in which the engine is stopped to allow the vehicle to run with inertia, the engine is started by the starting device before the operation of the assist device.

2. The vehicle controlling system according to claim 1, wherein
whether the engine is started is determined based upon a physical quantity concerning the engine a value of which changes according to the operation to the operation member.

3. A vehicle controlling system comprising:
an engine serving as a power source of a vehicle;
an electric storage device;
an assist device that assists an operation of a driver by consuming power from the electric storage device so as to operate a running device that changes the running condition of the vehicle; and
a starting device that consumes power from the electric storage device so as to start the engine, wherein
the starting device automatically starts the engine based upon a physical quantity concerning the engine and the start of the engine based upon the physical quantity is inhibited while the assist device operates the running device, during the execution of an inertial running in which the engine is stopped to allow the vehicle to run with inertia,
wherein the assist device assists an operation of the driver performed to an operation member of the running device so as to operate the running device, and
a value of the physical quantity is decreased by the operation to the operation member and is recovered when the engine is driven,
wherein the running device is a braking device that brakes the vehicle,
the assist device assists a braking operation by the driver and consumes the power from the electric storage device so as to operate the braking device, and
the physical quantity is a negative pressure of the engine introduced to a servo unit of the braking device.

4. The vehicle controlling system according to claim 3, wherein when at least either one of a running environment in which it is predicted that the operation to the operation member is to be performed and a running environment in which it is predicted that the assist device is to be operated is present ahead, a request of starting the engine is issued with the negative pressure greater than that in the case where neither of the running environments is present ahead.

5. A vehicle controlling system comprising:
an engine serving as a power source of a vehicle;
an electric storage device;
an assist device that assists an operation of a driver by consuming power from the electric storage device so as to operate a running device that changes the running condition of the vehicle; and
a starting device that consumes power from the electric storage device so as to start the engine, wherein
the starting device automatically starts the engine based upon a physical quantity concerning the engine and the start of the engine based upon the physical quantity is inhibited while the assist device operates the running device, during the execution of an inertial running in which the engine is stopped to allow the vehicle to run with inertia,
wherein the assist device assists an operation of the driver performed to an operation member of the running device so as to operate the running device, and
a value of the physical quantity is decreased by the operation to the operation member and is recovered when the engine is driven,
wherein when a running environment in which it is predicted that the assist device is to be operated is present ahead during the execution of the inertial running, the start of the engine by the starting device is inhibited even before the assist device operates the running device.

* * * * *